Figure 1:
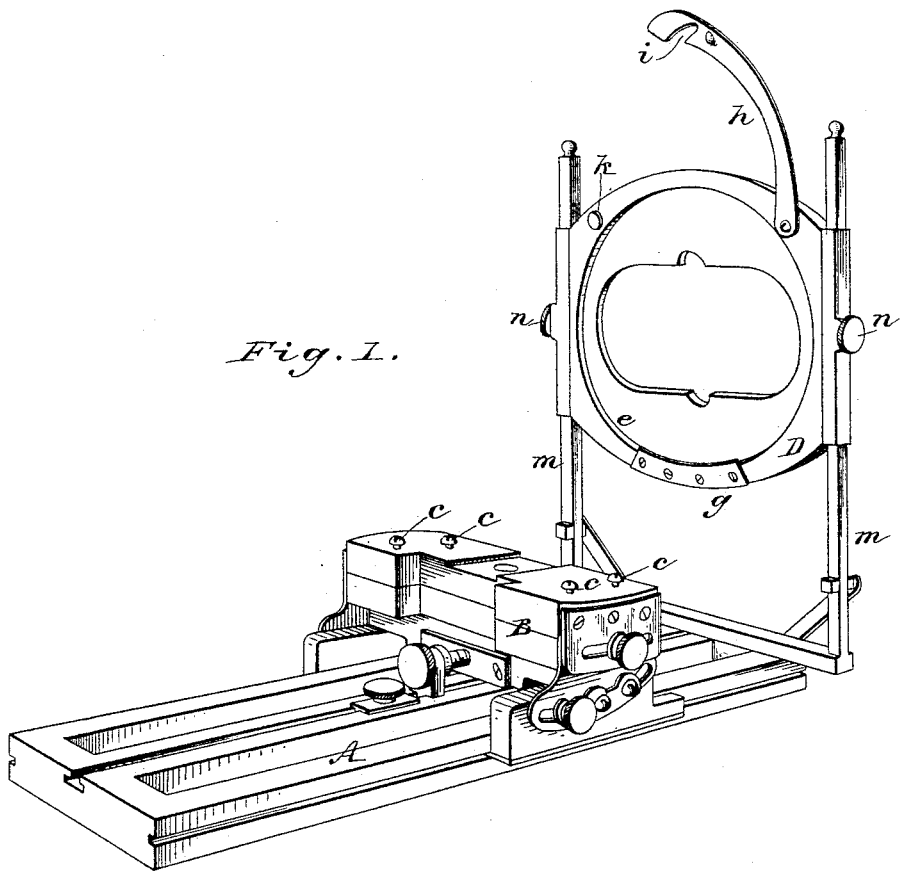

(No Model.) 3 Sheets—Sheet 1.

E. B. BARKER.
PHOTOGRAPHIC CAMERA.

No. 348,712. Patented Sept. 7, 1886.

WITNESSES:

INVENTOR:
E. B. Barker
BY Munn & Co.
ATTORNEYS.

(No Model.) 3 Sheets—Sheet 2.

E. B. BARKER.
PHOTOGRAPHIC CAMERA.

No. 348,712. Patented Sept. 7, 1886.

WITNESSES:

INVENTOR:
E. B. Barker
BY Munn & Co.
ATTORNEYS.

(No Model.) 3 Sheets—Sheet 3.
E. B. BARKER.
PHOTOGRAPHIC CAMERA.
No. 348,712. Patented Sept. 7, 1886.
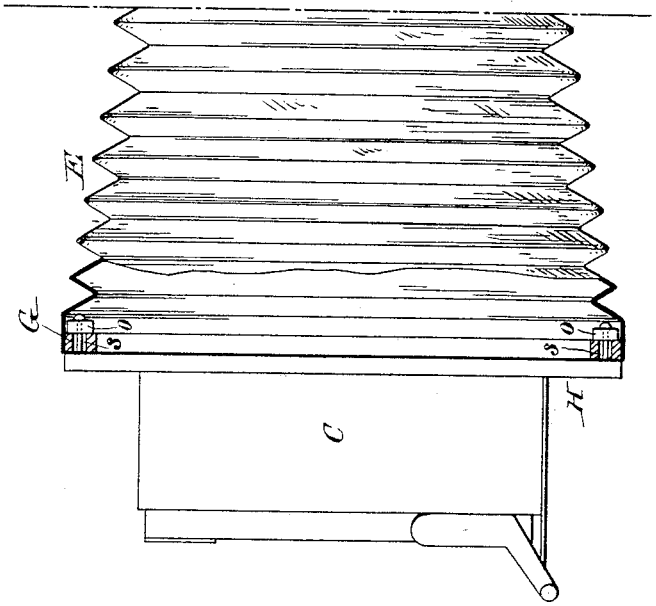
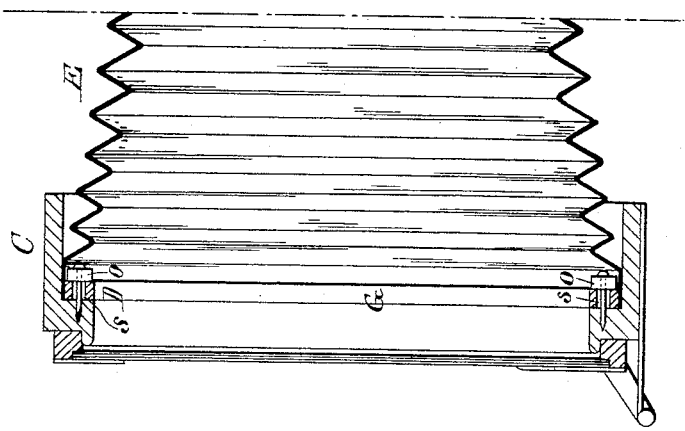
WITNESSES:
INVENTOR:
E. B. Barker
BY Munn &C.
ATTORNEYS.
N. PETERS, Photo-Lithographer, Washington, D. C.

UNITED STATES PATENT OFFICE.

ERASTUS B. BARKER, OF NEW YORK, N. Y., ASSIGNOR TO E. & H. T. ANTHONY & CO., OF SAME PLACE.

PHOTOGRAPHIC CAMERA.

SPECIFICATION forming part of Letters Patent No. 348,712, dated September 7, 1886.

Application filed March 9, 1886. Serial No. 194,564. (No model.)

*To all whom it may concern:*

Be it known that I, ERASTUS B. BARKER, of the city, county, and State of New York, have invented new and useful Improvements in Photographic Cameras, of which the following is a full, clear, and exact description.

This invention has for its object the adaptability of different-sized cameras or camera boxes or bodies with their bellows to one and the same front or lens frame and running-gear of the camera, thus greatly reducing expense and rendering more convenient the use of different-sized cameras.

To this end the invention consists, first, in a novel construction of the camera, whereby its body can be readily detached from the bellows and running-gear and another camera-body, either larger or smaller, be substituted therefor, substantially as hereinafter described; and, secondly, in a special construction of the camera, essentially as hereinafter specified, whereby and through the aid of suitable mechanism both its body and bellows can be readily detached from the running-gear and front or lens-holder support and another body and bellows, either larger or smaller, be substituted.

My invention furthermore, consists in certain special constructions and combinations of parts or details for carrying it into effect, including special means for enabling the same bellows to be used upon camera-bodies of different sizes, substantially as hereinafter described.

The invention is applicable both to rotatable and non-rotatable cameras—that is, cameras in which the camera-box may be reversed or adjusted to any desired position, as, for instance, to dispose its greater axis either in a horizontal or in a vertical plane, or in which the camera-box with its attached bellows is not thus adjustable. Said invention, however, will here be shown applied to a camera in which the bellows of the box is attached at its front end by a suitable revolving joint to the back of the lens holder or frame, so as to permit of the camera box and bellows being turned or revolved, as required.

Reference is to be had to the accompanying drawings, forming a part of this specification, in which similar letters of reference indicate corresponding parts in all the figures.

Figure 2:
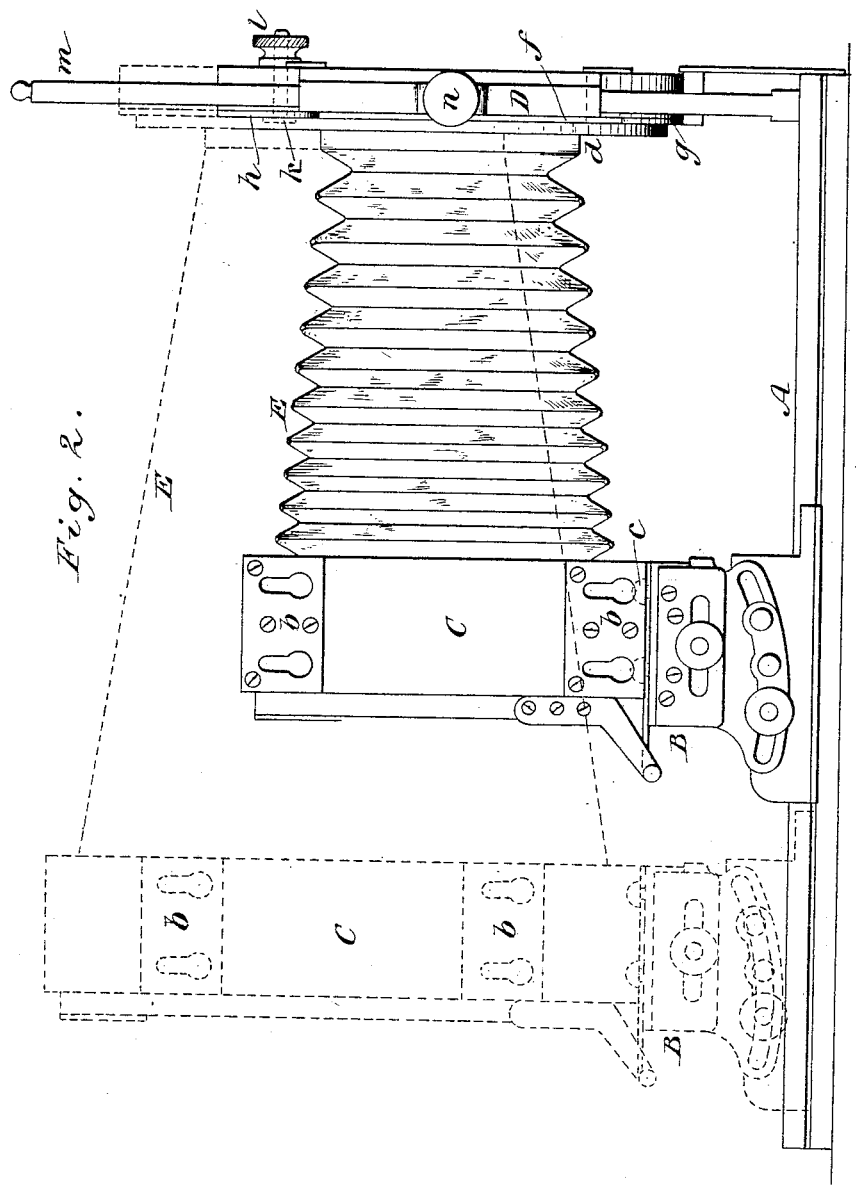

Figure 1 represents a view, in perspective, of the frame portion and running-gear of a camera with my invention in part in one of its forms applied, but omitting the camera box and bellows, and showing the means used to secure the forward end of the bellows as thrown open. Fig. 2 is a side elevation of like parts with the camera box and bellows secured in place, and showing by dotted lines the adaptability of the invention to a different-sized camera box and bellows. Fig. 3 is a partly sectional side view of the rear portion of a camera-bellows, together with the camera-body and certain means for detachably connecting the bellows with said body; and Fig. 4 is a vertical longitudinal section of the rear portion of the same bellows and a camera-body of different size, together with means for detachably connecting said bellows with said box.

Referring in the first instance to Figs. 1 and 2 of the drawings, A indicates the base of the running-gear of the ordinary or any suitable construction, and upon which the transverse slide B, that carries the camera-box C, moves for the purpose of focusing the instrument, said slide being adjustable for the purpose along said base A toward and from the front frame or lens-holder, D, by any suitable means, with provision, if desired, for varying the angular position of the camera-box facially in different directions, as in the case of other photographic cameras.

The camera-box C, to which the rear end of the bellows E is attached, is here shown as being made removable from the slide B and as engaging, by key-hole slotted plates $b\ b$, with screws $c\ c$ on the slide, said key-hole plates being applied to one of its sides and ends for the purpose of suitably turning or rotating the camera-box with its attached bellows to dispose the greater axis of the camera-box either in a horizontal or a vertical plane, while the front end of the bellows is attached to its support, as described in Patents Nos. 272,622 and 283,952, granted to me, respectively, on February 20, 1883, and August 22, 1883. Any other suitable means, however, may be employed than those here described, for connecting and disconnecting the camera-box with the running-gear, and, when such is desired, for turning it while the front end of the bellows is attached to the lens-frame for taking either vertical or lateral pictures without moving the lens-frame; but it is an essential feature that the camera-box and its attached bellows should be readily attachable to and detachable from the running-gear and front or lens frame, in order to permit of the use of cameras of different sizes in connection with the same running gear or stand and same front or lens frame and lenses. To this end, without restriction to the means described for attaching and detaching the camera-box to the running-gear, the joint formed by the front end of the bellows E with the lens-frame D is constructed so that it can be readily made and broken or opened, as required. This may be done in various ways; but the following means, constructed to provide for taking vertical or lateral pictures, are preferred: The bellows E, of usual form, has attached to its front end a ring, d, which fits partly within a circular recess, e, in the back of the lens-frame D. This ring d has a groove, f, in and around its outer perimeter, within which a section, g, of a ring, fast on the back of the lens-frame D, fits, while on the other side of what constitutes the axis of the lens a catch, h, pivoted to the lens-frame, also engages, when closed, with said groove f. This catch, which also may be of sectional ring form on its inner edge, serves, in conjunction with the fixed ring-section g, to lock or hold the front end of the bellows in or to the back of the lens-frame, yet permits of the free rotation of said end of the bellows, when required. When the catch is closed, it may engage by a notch, i, in it, with a pin, k, on the lens-frame, and be secured by a thumb-nut, l. Upon lifting or opening the catch h, however, as shown in Fig. 1, then the front end of the bellows may be lifted out of or away from the lens-frame, and the camera be removed from said frame and from the running-gear for replacement by another camera of different size, but having the front end of its bellows of like size, or thereabout, as shown by dotted lines in Fig. 2. The catch or lock h, which makes and breaks the joint between the front end of the bellows and the lens-frame, may be of any other suitable construction that will admit of the ready entry and removal of said end of the bellows. To provide for this interchange of cameras, and for the varied adjustment of the camera-box with its greater or lesser axis in a horizontal plane, the lens-frame B may be made adjustable up or down its posts m m, and be secured in the requisite position by set-screws n, as shown.

Increased facility will be afforded for using camera-bodies of different sizes upon the same running-gear by making the bellows not only detachable at their front end from the front or lens frame, but also detachable at their rear end from the camera body or box. Thus in Figs. 3 and 4 of the drawings, which respectively show camera-bodies C of different sizes, the same bellows E is shown applied to both, instead of using attached and independent bellows of different sizes throughout the main portion of their length and at their rear end, thereby doing away with a multiplicity of bellows. To thus operate and use the same bellows, they are shown as provided at their rear end with a frame, G, adapted to fit, when applied to a small camera-body, C, as in Fig. 3, and to detachably engage, as by buttons o, capable of passing through oblong slots s in said frame, with a face board or plate, H, on the front end of the camera-body. Upon removing said bellows, however, from the smaller camera-body (shown in Fig. 3) to a larger camera-body, C, (shown in Fig. 4,) the frame G may be entered within the front end of said larger camera-body, and be detachably secured by like buttons, o, thereto. The invention, however, is not restricted to any particular fastenings for detachably connecting the rear end of the bellows with camera-bodies of different sizes.

Having thus fully described my invention, what I claim as new, and desire to secure by Letters Patent, is—

1. In a photographic camera, the combination, with the running-gear, of the body of the camera and its bellows, made readily detachable from each other and said body from the running-gear, whereby a different-sized camera-body may be substituted, substantially as specified.

2. In a photographic camera, the combination, with the running-gear and with the lens-holder support, of the camera-body and its bellows, made readily detachable from the running-gear and from the front of the instrument or lens-holder support, whereby another body and bellows of different size may be substituted, essentially as herein set forth.

3. In a photographic camera in which the body is made readily detachable from the running-gear of the instrument, the bellows of the camera, provided with a frame at its rear end, in combination with fastenings adapted to engage and disengage said frame with and from the camera-body, essentially as specified, whereby the same bellows may be readily applied to camera-bodies of different sizes.

4. In a photographic camera, the combination, with the lens-holder support or frame and the body of the camera, of detachable bellows and an opening and closing engaging device arranged on the lens-frame for quickly releasing the bellows therefrom or locking the bellows to said frame, whereby camera-bodies of different sizes may be readily substituted one for the other upon the same running-gear, as set forth.

5. The combination, with the lens-holder or frame D, of the camera-bellows E, constructed to form a revolving joint with said frame, the fixed ring-section $g$, and opening and closing fastening $h$, adapted to engage on opposite sides of the axis of the bellows with the front end of the bellows, the detachable camera-box C, to which the rear end of the bellows is attached, and the running-gear of a camera, essentially as shown and described.

ERASTUS B. BARKER.

Witnesses:
EDGAR TATE,
EDWD. M. CLARK.